United States Patent Office 2,719,800
Patented Oct. 4, 1955

2,719,800

FLUX COMPOSITION AND ITS METHOD OF PRODUCTION

Charles P. Veltri, Miami, Fla.

No Drawing. Application June 26, 1951,
Serial No. 233,710

2 Claims. (Cl. 148—26)

This invention relates generally to an improved flux composition for brazing, welding and soldering metals and is more particularly directed to a flux utilized in conjunction with acetylene and other flame type welding, brazing and soldering of metals such as cast iron, steel, steel alloys, chrome alloys, bronze, copper, silver and the like.

It is a primary object of the present invention to provide an all purpose flux for welding, brazing and silver soldering metals by the flame heating method, wherein the flux of the instant invention is adapted to be utilized on a multitude of metals, all of which metals presently require a variety of fluxes, so that those now in the business of welding, brazing and silver soldering metals who must have on hand a number of different kinds of fluxes may eliminate the need for those fluxes upon using the said flux.

A further object of the present invention is to provide a flux which is capable of performing a high quality welding, brazing or silver soldering function without the necessity of first removing impurities on the metals, such impurities including grease, grime, dirt or plating such as lead, tin and zinc. It has been found that when utilizing the flux of the present invention on a plated metal, the plating leaves the surface of the metal at the locus of the heated surface thereby permitting a high quality bond, and upon the cooling of the metal parts, the plating is found to be formed on the metal welded or brazed thereon.

A still further object of the present invention is to provide a flux which is more economical in use than the present fluxes, which permits a superior fusion of metals, and which also is capable of accomplishing the welding and brazing of metals such as stainless steel and extremely hard steel alloys which function heretofore has been considered virtually impossible.

A still further object of the present invention is to provide a flux compound which is simple in application and which permits an operator having little or no skill in the art of welding, brazing and silver soldering to effect a high quality bond of the metals being fused together.

To attain the above indicated objects and other objects disclosed in the present specification the improved flux compound of the instant invention consists of the following chemicals mixed in the manner described and substantially in the proportions stated as follows:

| | Parts |
|---|---|
| Borax | 4 |
| Bicarbonate of soda | 4 |
| Boric acid | 4 |
| Sodium chloride | 2 |
| Ammonium chloride | 2 |
| Air-slaked lime | 1 |

The above listed chemicals in powdered form are first pulverized to an extremely fine powdered condition, and are then mixed in the manner described hereinafter. In order to prevent chemical reaction between the more active ingredients of those making up the instant flux, the borax, bicarbonate of soda and boric acid are first thoroughly mixed together. To this are added first sodium chloride then ammonium chloride, all of which is mixed very thoroughly. A mild chemical reaction takes place wherein the ammonium chloride then becomes coated. This coating prevents the ammonium chloride from coming into direct contact with the air slaked lime which is now added to the mixture and thoroughly mixed. It has been found that in mixing air slaked lime and ammonium chloride together without having previously mixed the other ingredients of the flux, the two chemicals combine chemically to form a gummy mass and thereby neutralize each other.

This composition, after being thoroughly mixed is permitted to rest or age for a period of approximately 48 hours or longer, during which time it becomes a somewhat hardened mass. It appears that a mild chemical action takes place between the various chemicals during this curing period, after which the hardened mass is again pulverized and the flux composition is ready for packaging. As long as the instant flux is maintained under ordinary climatic conditions it will always maintain itself in a powdered condition and will not harden.

The flux compounded as indicated above is then ready for use. It can be moistened with water and the like and made into a paste or it may be utilized in its powdered state. In either instance, the metal parts being welded, soldered or brazed are first heated, then the rod or the like being used to weld, braze or silver solder is heated. The rod is dipped into the flux compound so as to cause the flux to adhere to the walls of the rod. The free end of the rod with the flux adhering thereto is then applied to the metals being welded while the flame is directed against same. As the rod melts, the flux begins to commence its action to complete the weld. The ammonium and sodium chloride serve to remove the impurities such as grease, grime and dirt, and any plating such as lead, tin and zinc from the spot the fusion is to take place. The flux seems to form a gaseous envelope at the molten portion of the metal which is the spot at which the fusion is to take place. This gaseous envelope pushes aside the aforesaid impurities until the bond is complete and the heat removed from the molten metal and likewise prevents the formation of pin holes in the bonding metal. It has been observed that the aforesaid gaseous envelope moves along with the flame as the torch is directed along the seam being fused, and as the gaseous envelope moves, it relinquishes the force it exerted in pushing aside the impurities, plating, etc., the plating spreads itself back over the previously fused portions thereby re-plating it. The bicarbonate of soda neutralizes any and all acids that may prevail thereon; the borax causes the metals to heat uniformly and keeps the pores therein open so as to receive the molten metal of the rod, while the boric acid compels such metals as brass, copper and bronze to flow evenly in the path of the flame as directed at the parts being welded or brazed.

It has been found that the flux as compounded in the manner described, in addition to bringing about high quality welds of cast iron, steel, steel alloys, is capable of effecting the brazing of stainless steel which has been to date virtually impossible. The instant flux is capable of permitting copper to be brazed to such metals as steel and the like, and also to sweat two pieces of metal with copper as a binder for the metals. Articles such as ship propellers and the like made of bronze, brass, etc. which have been worn, broken or whose surfaces have been pockmarked by electrolysis can be restored to new condition by resurfacing or mending same by welding thereon a bronze alloy with the application of the instant flux. Also, if any welding, brazing or soldering operation has to be done overhead, the application of the instant flux retains the molten welding material in a globular mass thereon by its ability to concentrate the flame heat in a relatively small area thereby preventing any spattering or dripping while causing the pores of the metals being welded to be opened thereby effecting a high quality bond between the metals. It has been found that the instant flux is capable of effecting a better weld than the more expensive fluxes utilized in silver soldering, which fluxes contain fluorides that produce noxious and otherwise dangerous gases.

At present different metals require different types of flame welding equipment such as cast iron, stainless steel and bronze alloys require a carbonizing gas flame while steel, copper, chrome alloys require a full neutral (non-oxidizing or carbonizing) gas flame. Therefore, an operator must be an expert welder in order to be able to set the proper flame condition for the particular metal being welded in order to make the flame oxidizing, carbonizing or neutral as required. The utilization of the instant flux permits the proper formation of a weld without the necessity of having the proper flame formation condition since the flux permits a proper gas formation to be formed at the point of weld under any circumstances. It has been found by experiment that the requirement of a carbonizing and neutral flame are met by the instant flux and in the event an oxidizing flame is formed which may be detrimental to the weld, the flux inhibits the formation of metal oxidation during the welding process.

Having described my invention, what I claim as new is:

1. The method of producing a flux compound for use in brazing, welding and soldering different metals and their alloys which consists essentially in mixing approximately 4 parts finely pulverized borax, approximately 4 parts of finely pulverized bicarbonate of soda and approximately 4 parts of boric acid; thereafter adding to this mixture approximately 2 parts of finely pulverized sodium chloride and approximately 2 parts of finely pulverized ammonium chloride; permitting a mild reaction to take place wherein said ammonium chloride becomes coated; thereafter adding approximately one part of finely pulverized air-slaked lime; thereafter permitting the mixture to age until it becomes a somewhat hardened mass, and thereafter pulverizing said hardened mass.

2. A pulverized flux composition for use in brazing, welding and soldering different metals and their alloys, which consists essentially of approximately 2 parts of finely divided ammonium chloride particles individually coated with approximately 4 parts of borax, approximately 4 parts of boric acid and approximately 4 parts of bicarbonate of soda and said coated ammonium chloride being mixed with approximately 2 parts sodium chloride and one part of air-slaked lime.

References Cited in the file of this patent

UNITED STATES PATENTS

| | | |
|---|---|---|
| 1,271,125 | Braund et al. | July 2, 1918 |
| 1,676,988 | Maryan | July 10, 1928 |
| 1,714,445 | Reuss | May 21, 1929 |
| 1,968,841 | Maffia | Aug. 7, 1934 |
| 2,267,763 | Streicher | Dec. 30, 1941 |
| 2,467,544 | Whitcomb | Apr. 19, 1949 |